US007652787B2

(12) United States Patent
Ahne et al.

(10) Patent No.: US 7,652,787 B2
(45) Date of Patent: Jan. 26, 2010

(54) ARCHITECTURE AND MEMORY CARD FOR HAND-HELD PRINTER

(75) Inventors: Adam Jude Ahne, Lexington, KY (US); Thomas Jon Eade, Lexington, KY (US); Michael Kelley Webb, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 888 days.

(21) Appl. No.: 11/260,340

(22) Filed: Oct. 27, 2005

(65) Prior Publication Data

US 2007/0176957 A1 Aug. 2, 2007

(51) Int. Cl.
*G06K 1/00* (2006.01)

(52) U.S. Cl. .......................... 358/1.6; 358/1.3; 358/1.4; 358/1.9; 358/1.16; 358/471; 358/473; 347/5; 347/9; 347/16; 347/19

(58) Field of Classification Search ................. 358/1.3, 358/1.4, 1.6, 1.9, 1.16, 471, 473; 347/5, 347/9, 16, 19, 100
See application file for complete search history.

(56) References Cited

U.S. PATENT DOCUMENTS 4,916,638 A * 4/1990 Haselby et al. .............. 358/1.5
5,446,559 A 8/1995 Birk
5,927,872 A * 7/1999 Yamada ....................... 400/88
6,091,509 A 7/2000 Hickman et al.
6,195,513 B1 2/2001 Nihei et al.
6,357,847 B1 3/2002 Ellson et al.
6,426,801 B1 7/2002 Reed
6,553,459 B1 4/2003 Silverbrook et al.
6,773,177 B2 * 8/2004 Denoue et al. ................ 400/88
6,999,113 B1 * 2/2006 Omura .................... 348/207.2
2002/0113980 A1 8/2002 Reed
2003/0217210 A1 * 11/2003 Carau, Sr. ................... 710/302
2004/0008374 A1 1/2004 Choi
2004/0189959 A1 9/2004 Kito
2005/0128510 A1 6/2005 Campbell
2005/0185205 A1 8/2005 Eckhaus et al.
2007/0120937 A1 * 5/2007 Ahne et al. ................. 347/109

* cited by examiner

*Primary Examiner*—Chan S Park

(57) ABSTRACT

A printer architecture and memory card is described. The architecture can include an integrated circuit and a memory card. The memory card can include print swaths and bit-maps of thumbnail images associated with the print swaths. The thumbnail images can be displayed on the hand-held printer. A print swath associated with the selected thumbnail image can be printed.

3 Claims, 6 Drawing Sheets

*Printhead Position*

1--------------------28

```
1111111111111111111111110000   1
1111111111111111111111111000
1111000000000000000000111100
1111000000000000000000011110
1111000000000000000000001111
1111000000000000000000011110
1111000000000000000000111100
1111000000000000000001111000
1111111111111111111111000000
1111111111111111111110000000
1111000000000000000000000000
1111000000000000000000000000
1111000000000000000000000000
1111000000000000000000000000
1111000000000000000000000000
1111000000000000000000000000
1111000000000000000000000000   17
```

*Printhead Nozzle*

500

ARCHITECTURE AND MEMORY CARD FOR HAND-HELD PRINTER

BACKGROUND OF THE INVENTION

Electronic images can be stored in a number of different formats. The most common formats for storing images today are the Joint Photographic Experts Group ("JPEG") standard or bit-maps. Bit-maps include a set of data (one-bit for monochrome to multiple bytes for true color) for each pixel (or dot) of an image. A bit-map image in XGA format (1024×768 pixels) using 64 k colors (two bytes) would require nearly 1.6 million bytes of storage. JPEGs use compression techniques to reduce the storage needed with minimal loss of detail. Typically JPEGs reduce the storage necessary by a ratio of 10:1 or 20:1 (greater compression can be achieved with further losses of detail).

Ink-jet printers have large numbers of ink-jets which deposit drops of ink on a medium. The drops are very small and different colored drops can be combined to achieve true color printing. A typical print head can have 300 to 600 ink-jets. For ink-jet printers, a print swath is data that indicates when each ink-jet is to deposit a drop of ink on the medium for a single pass of the print head over the media. Host-based printers rely on the host (typically a computer) to provide the printer with print swaths for each pass of the print head over the media. Host-based printers typically require a connection between the host and the printer to transfer the print swaths to the printer.

Other types of printers may have the ability to access different format data images (e.g., JPEG) and convert the data into the required print swaths. A digital photo printer would be an example of this type of printer. A digital camera takes a picture and stores the image on a memory card in JPEG format. The memory card can be removed from the camera and inserted into a digital photo printer. The printer can read the JPEG image on the memory card and convert the JPEG image to print swaths and print the image. This type of printer requires significant processing power in order to convert the stored image into the print swaths required for printing.

SUMMARY OF THE INVENTION

In one embodiment, the invention provides a memory card that can include data for a hand-held printer. The data can include a data table, one or more print swaths specific to the hand-held printer, and one or more bit-maps of thumbnail images associated with the print swaths.

Some embodiments of the invention provide a method of printing an image with a hand-held printer. The method can include storing at least one print swath in a memory card, with the at least one print swath being specific to the hand-held printer. The method can also include storing at least one bit-map of at least one thumbnail image in the memory card, with the at least one thumbnail image associated with the at least one print swath. The method can further include viewing and selecting the at least one thumbnail image and printing the print swath associated with the selected thumbnail image.

In some embodiments, the invention provides architecture for a hand-held printer. The architecture can include an integrated circuit and a memory card connected to the integrated circuit. The memory card can store one or more print swaths that are specific to the hand-held printer and one or more bit-maps of thumbnail images associated with print swaths.

Other aspects of the invention will become apparent by consideration of the detailed description and accompanying drawings.

DETAILED DESCRIPTION OF THE INVENTION

Figure 1:
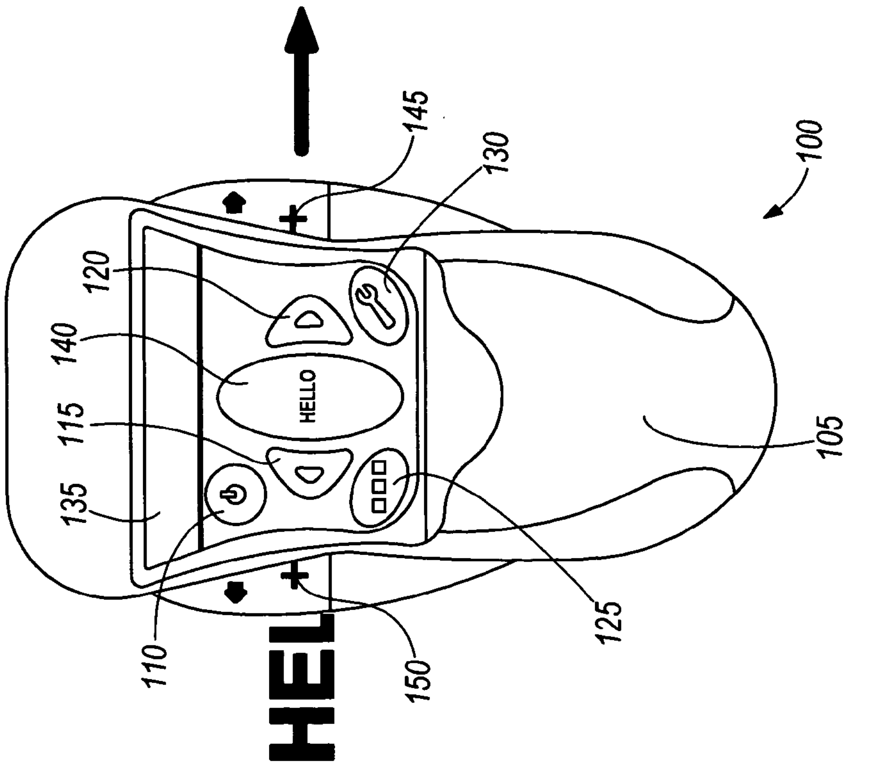
FIG. 1 is a top view of a hand-held printer printing left-to-right according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings, and can include electrical connections or couplings, whether direct or indirect.

In addition, it should be understood that embodiments of the invention include both hardware and software components or modules. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

Embodiments of the invention relate to systems and methods for operating a hand-held printer. The hand-held printer can print icons (i.e., images or text) that can be stored on a removable memory card. In some embodiments, the icons can range in size from ½" by ½" to ½" by 12". Images of the icons can be displayed on the hand-held printer to enable a user to select which icon to print. To reduce the processing power necessary in the hand-held printer, the icons can be stored on the memory card in a format that can be used by the hand-held printer with substantially no modification to the data.

FIG. 1 illustrates one embodiment of a hand-held printer 100. A main body 105 of the hand-held printer 100 can be formed to fit in the palm of a user's hand and can resemble a standard computer mouse in size and shape, in one embodiment. The hand-held printer 100 can have a number of buttons for operating the hand-held printer. An on/off button 110 can be included on the hand-held printer 100. A scroll left button 115 and a scroll right button 120 can be included on the hand-held printer 100. A repeat button 125 and a maintenance button 130 can also be included on the hand-held printer 100. A print button 140 can be included on the hand-held printer 100.

In some embodiments of the hand-held printer 100, the hand-held printer 100 can include a display 135. In one embodiment, the display 135 can be a monochrome liquid crystal display ("LCD") and can be 32.7 mm by 26.1 mm and can have a resolution of 101 pixels by 81 pixels. Other embodiments of the hand-held printer 100 can have other types of displays including color displays and displays of different sizes and resolutions.

Figure 2:
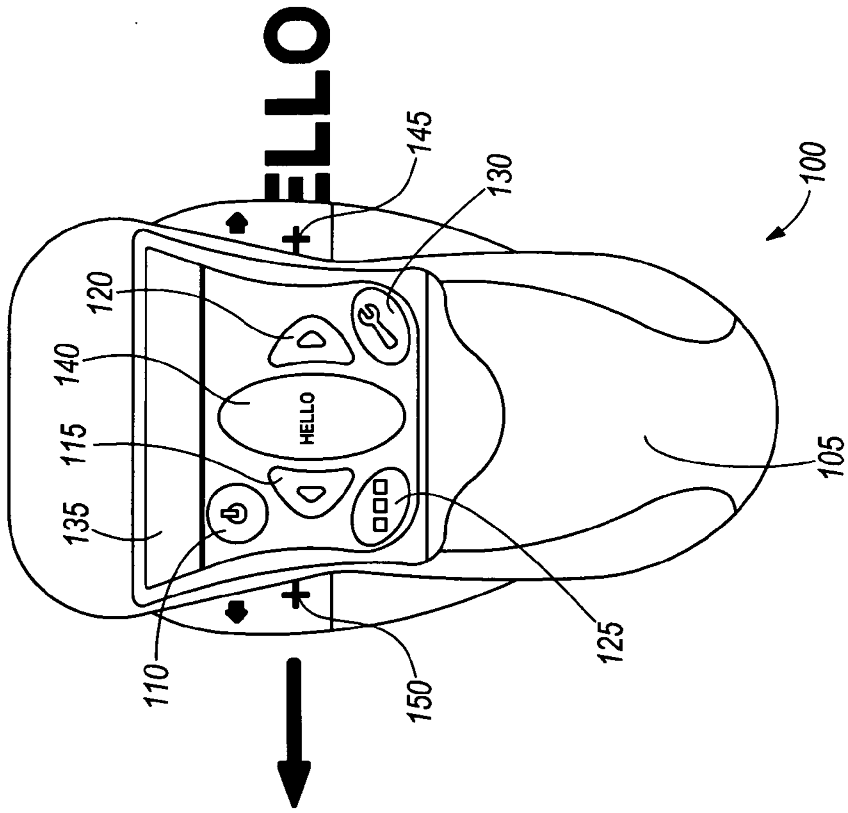
FIG. 2 is a top view of a hand-held printer printing right-to-left according to one embodiment of the invention.

The hand-held printer 100 can include one or more guides to assist a user in printing. A right side guide 145 can assist users in printing in a left to right direction, as shown in FIG. 1. A left side guide 150 can assist users in printing in a right to left direction, as shown in FIG. 2.

Figure 3:
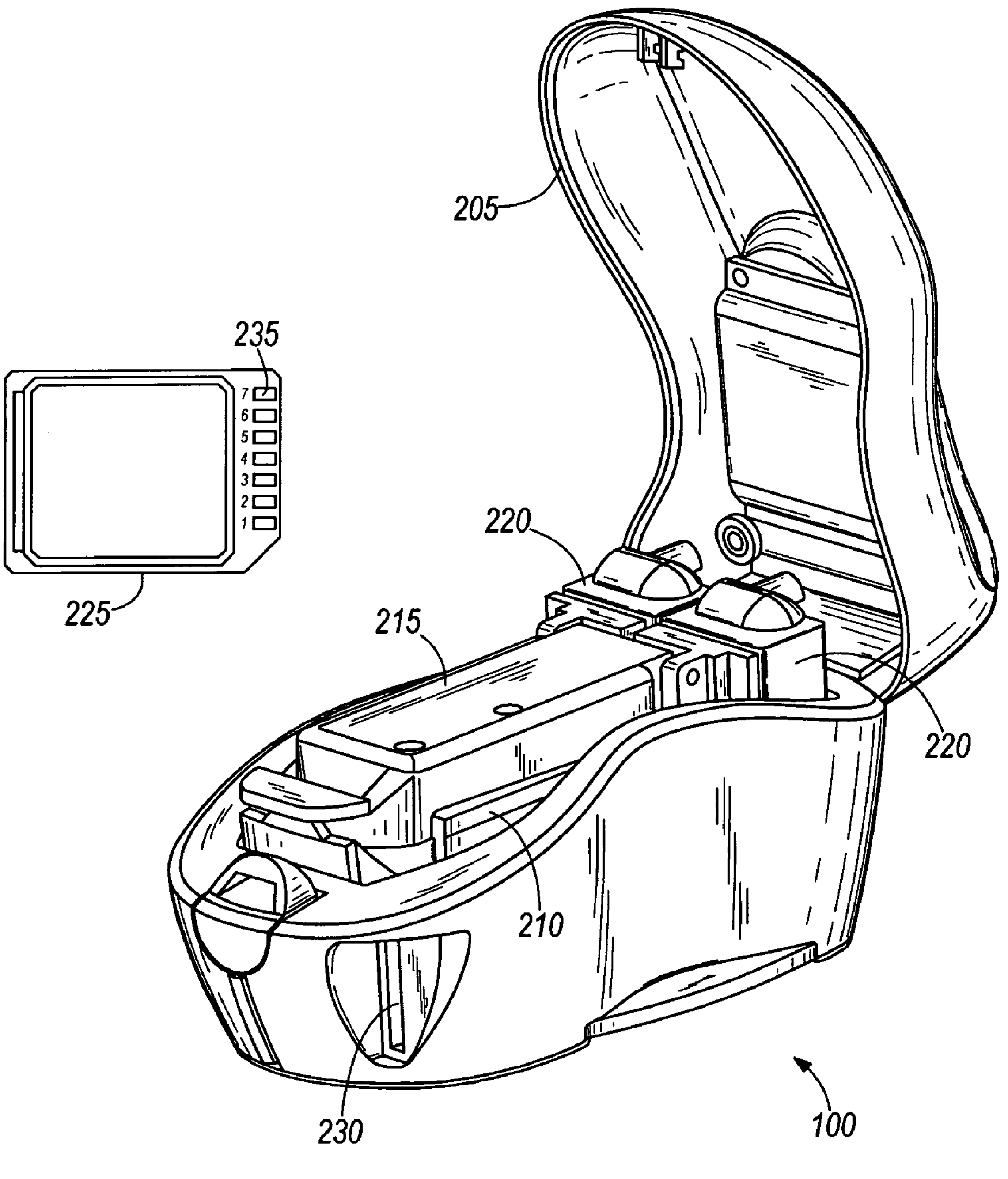
FIG. 3 is a perspective view of a hand-held printer according to one embodiment of the invention in an open position.

FIG. 3 illustrates the hand-held printer 100 with a first hinged cover 205 in an open position. The hand-held printer 100 can include a print cartridge 210 with a thermal printhead (not shown). The printhead can include two columns of print nozzles. In one embodiment, each column of print nozzles can include 320 individual nozzles aligned vertically. In some embodiments, the print nozzles can function in pairs, so that when a print nozzle in the first column prints, the print nozzle from the same row in the second column prints as well. This printing configuration can allow the printed image to appear nearly normal when a print nozzle in one column does not function properly (e.g., becomes clogged). The print cartridge 210 can be held in place by a second hinged cover 215. In one embodiment, the hand-held printer 100 can be powered by two 9 Vdc alkaline batteries 220.

In some embodiments, a memory card 225 can be inserted into a slot 230 in the front or another suitable portion of the hand-held printer 100. In one embodiment, the slot 230 can be accessed with the first hinged cover 205 closed, so that the memory card 225 can be exchanged for another memory card 225 without opening the hand-held printer 100. In some embodiments, the memory card 225 can be held in place by a biasing spring (not shown). The memory card 225 can be pressed into place. Pressing the memory card 225 again can release the memory card 225, so that the memory card 225 can be removed from the slot 230.

In one embodiment, the memory card 225 can have seven connectors 235 for transferring data to and from the memory card 225. When a memory card 225 is inserted into the slot 230 on the hand-held printer 100, the connectors 235 can mate with corresponding connections in the hand-held printer 100 and can enable the hand-held printer 100 to read the data stored on the memory card 225.

Figure 4:
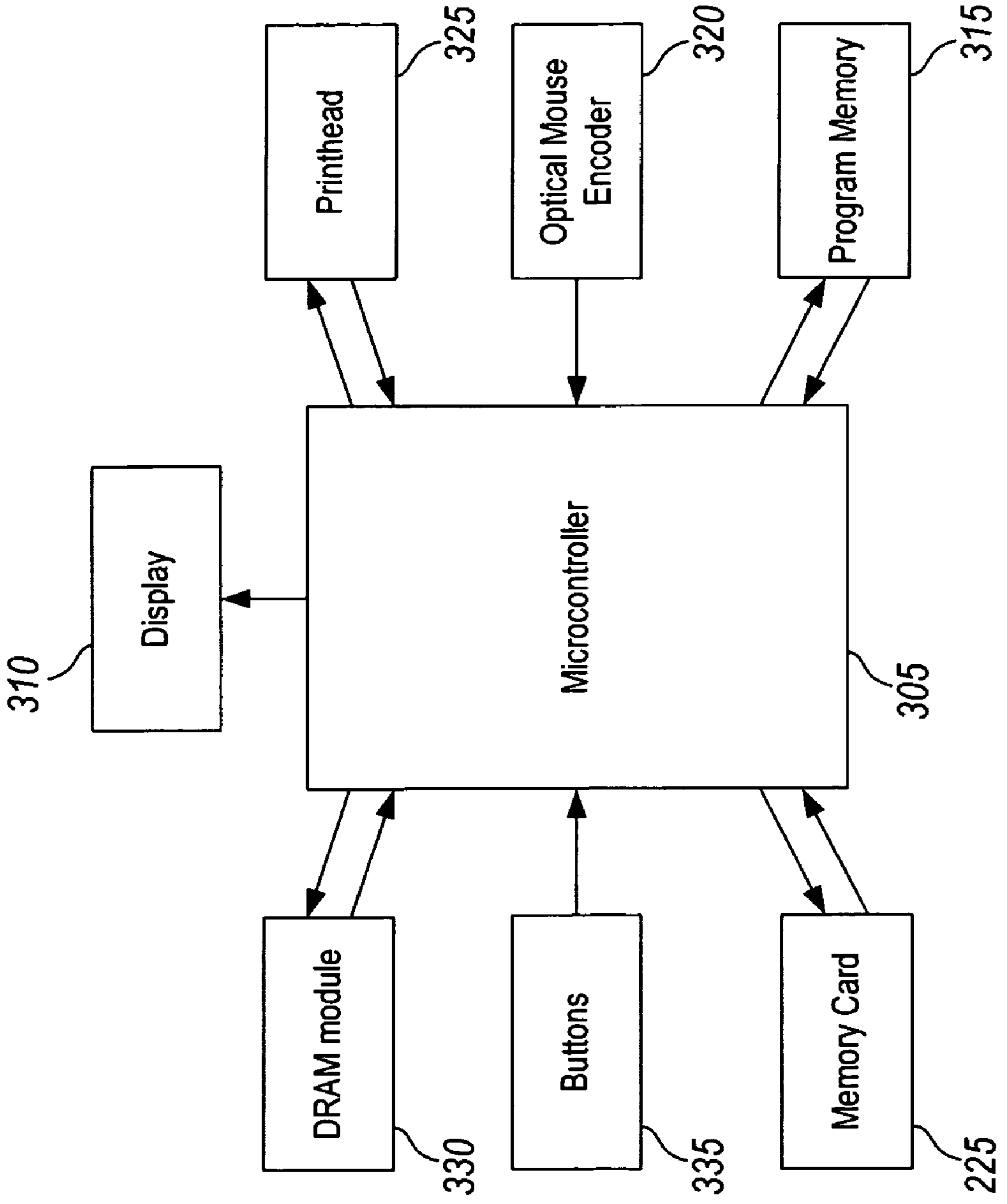
FIG. 4 is a schematic illustration of architecture for a hand-held printer according to one embodiment of the invention.

FIG. 4 illustrates one embodiment of architecture for the hand-held printer 100. The architecture of the hand-held printer 100 can include a microcontroller 305, a display 310, a program memory 315, an optical mouse encoder 320, a printhead 325, a dynamic random access memory ("DRAM") module 330, buttons 335, and the memory card 225. As used herein and in the appended claims, the term "microcontroller" is not limited to just those integrated circuits referred to in the art as microcontrollers, but broadly refers to one or more microcomputers, processors, application-specific integrated circuits, or any other suitable programmable circuit or combination of circuits.

In one embodiment, the microcontroller 305 can be a low cost, low power application specific integrated circuit ("ASIC"). The display 310 can be a monochrome LCD display and can have a resolution of 101 pixels by 81 pixels. In one embodiment, the memory card 225 can be a 2-megabyte serial flash memory card (e.g., such as a model AT45DCB002 manufactured by Atmel).

The printhead 325 can perform the function of transferring ink from the hand-held printer 100 to the media being printed on. The printhead 325 can be a single color (e.g., black) or can contain multiple colors to print in full color. The printhead 325 can be a suitable printhead technology, such as ink-jet, laser, and dot matrix. In some embodiments, the printhead 325 can be a single color thermal ink-jet. The printhead 325 can include multiple print nozzles for depositing ink on the print media. The print nozzles can be in vertical alignment.

Figure 5:
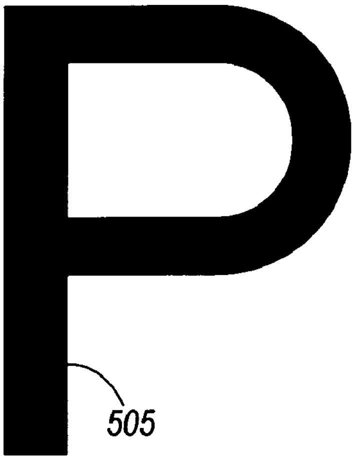
FIG. 5 is an illustration of a print swath.

The memory card 225 can include data for printing icons (e.g., the "P" 505 of FIG. 5). The data on the memory card 225 can include a number indicating the number of icons stored on the memory card 225, a checksum, one or more bit-maps of thumbnail images, one or more print swaths, one or more pointers to the bit-maps, and one or more pointers to the print swaths.

A checksum can be used to determine the integrity of data stored in memory. The checksum can be implemented in byte, word, or multi-word formats. The checksum can include the entire memory or a portion of the memory. Other embodiments can use other methods of ensuring the integrity of the data on the memory card 225. These methods can include cyclic redundancy codes ("CRC").

The bit-maps can be monochrome or color and can contain data for each pixel in an image. For monochrome bit-maps, the data can be a single bit. For color bit-maps the data can be any amount of data necessary to identify the color of each pixel.

The print swaths include data that instructs each print nozzle of the printhead 325 when to print. The printing instructions contained in the print swath data determine the sequence and timing of the firing of the nozzles in the printhead. As a result, in an embodiment of the present invention, the print swath instructions are specific to the printing device and to the location, number and placement of the nozzles on the printhead. Thus, for example, if the nozzles were disposed in a pattern that was not anticipated by the print swath data, then the printing or nozzle firing instructions contained in the print swath data would either result in an error or a different than intended print pattern.

In most printer devices that are known in the art, driver software is responsible for converting text or image that is stored in one of several known and supported standard formats into an appropriate print swath is written specifically for a particular hardware configuration. That is, the software driver is responsible for converting the to-be-printed data into swath data that will cause the correct image to be printed by the device. In one embodiment of the present invention, no such driver is necessary. As is described in greater detail below, the image data stored in memory (such as a memory card) and transferred to the memory of the printing device is stored in a format that is specific to the device that performs the printing operation. Thus the function of converting image data into print swath data that can be interpreted by the printing device is not necessary as the data of the to-be-printed image or text is already stored in a format that is specific to the hardware configuration of the printing device.

FIG. 5 illustrates a print swath 500 for printing the capital letter "P" 505 using a printhead 325 with seventeen print nozzles aligned vertically in a single column. As the "P" 505 is printed from left-to-right, the print swath 500 can direct each nozzle when to deposit ink and when to not deposit ink. As shown in FIG. 5, as the printhead 325 moves from left-to-right and from printhead position 1 to printhead position 28, the print swath 500 can start in its first column and all seventeen nozzles can deposit ink. As the printhead 325 moves to the right, all seventeen nozzles can deposit ink for the first four printhead positions. Once the printhead 325 reaches printhead position 5, nozzles 1, 2, 9, and 10 can deposit ink and the other nozzles do not deposit ink. Therefore, for each printhead position, the print swath 500 can include data for each print nozzle in order to inform the print nozzle whether to deposit ink on the media or not.

In some embodiments, data stored on the memory card 225 is separated into two sections. A first section is a data table that indicates the type and amount of printable and/or displayable data included in the memory card, and a second section, a data set section, where the actual image data displayed by the printer and the printable data that can be printed by the hand-held printer 100 is stored.

To illustrate, the following paragraphs describe a memory card on which a series of printable icons are stored, and on which a displayable thumbnail image for each printable icon is stored. One of ordinary skill will readily recognize that the invention is not limited to the described embodiment, and that the specific type and quantity of information stored on a memory card may vary.

As described above, the memory area in a memory card can be separated into a data table or metadata area and an area that holds actual printable and/or displayable data. In an embodiment in which a memory card contains a number or printable icons and displayable thumbnail images of each printable icon, the information stored in the metadata memory area includes a number n representing a number of icons stored on the memory card, thumbnail pointers that show the location of the thumbnail image for each of the n icons, printer swath pointers that show the location of the print swath data for each of the n icons, a start print value that represents the distance a target hand-held printer travels before the print swath begins printing and at least one checksum digit.

Some or all of the foregoing fields may be optional in alternative embodiments, or additional fields may be added to the metadata area of the memory card. To continue with the illustration, the data set area of the memory card is the area in which the actual thumbnail image and print swath data is stored. No particular configuration is required as the thumbnail and printer swath pointers in the data area indicate the location of the thumbnail and print swath data.

As described below, when the memory card is inserted into a handheld printer or other printing device, a processor retrieves some or all of the information on the memory card. In one embodiment, the printing device is equipped with a display and a processor on the device is configured such that the thumbnail images of each of the printable icons can be displayed to a user. The processor identifies the location of each thumbnail data from the thumbnail pointers stored in the metadata area and retrieves the thumbnail data, typically stored as bitmap data or the like, from the memory location identified by the thumbnail pointer. Similarly, upon receipt of a command that an icon is to be printed, the processor associated with the printing device examines the printer swath pointer in the metadata to identify the location from which to retrieve the print swath data.

In one embodiment, the print swath data is designed to work with the specific hardware of the printing device. In alternative embodiments, the to-be-printed data may be stored in another format such as BMP, JPEG, or GIF and the handheld device may be configured to convert the image data into a printer swath appropriate to the hardware of the printing device. And in other alternative embodiments, the processor may be adapted to determine the print swath from the thumbnail image data, or the print swath data may exist without the thumbnail image data being present.

Additional information about the print swath may be stored in the metadata area of the memory card. In the illustrated example, a value representing the distance a printer must travel before a swath begins to print is associated with the print swath data. Thus, as part of the printing process, the printing device would travel the designated distance before printing the swath. In one embodiment, the value representing this distance is stored in increments of $\frac{1}{400}^{th}$ of an inch and ranges from 0 to 63 inches. In alternative embodiments, other variables relating to the printing of the swath may be included in the metadata area, including a value representing a distance between successively printed icons, a printing dimension, a particular font, or a color choice to name just a few.

Figure 6A:
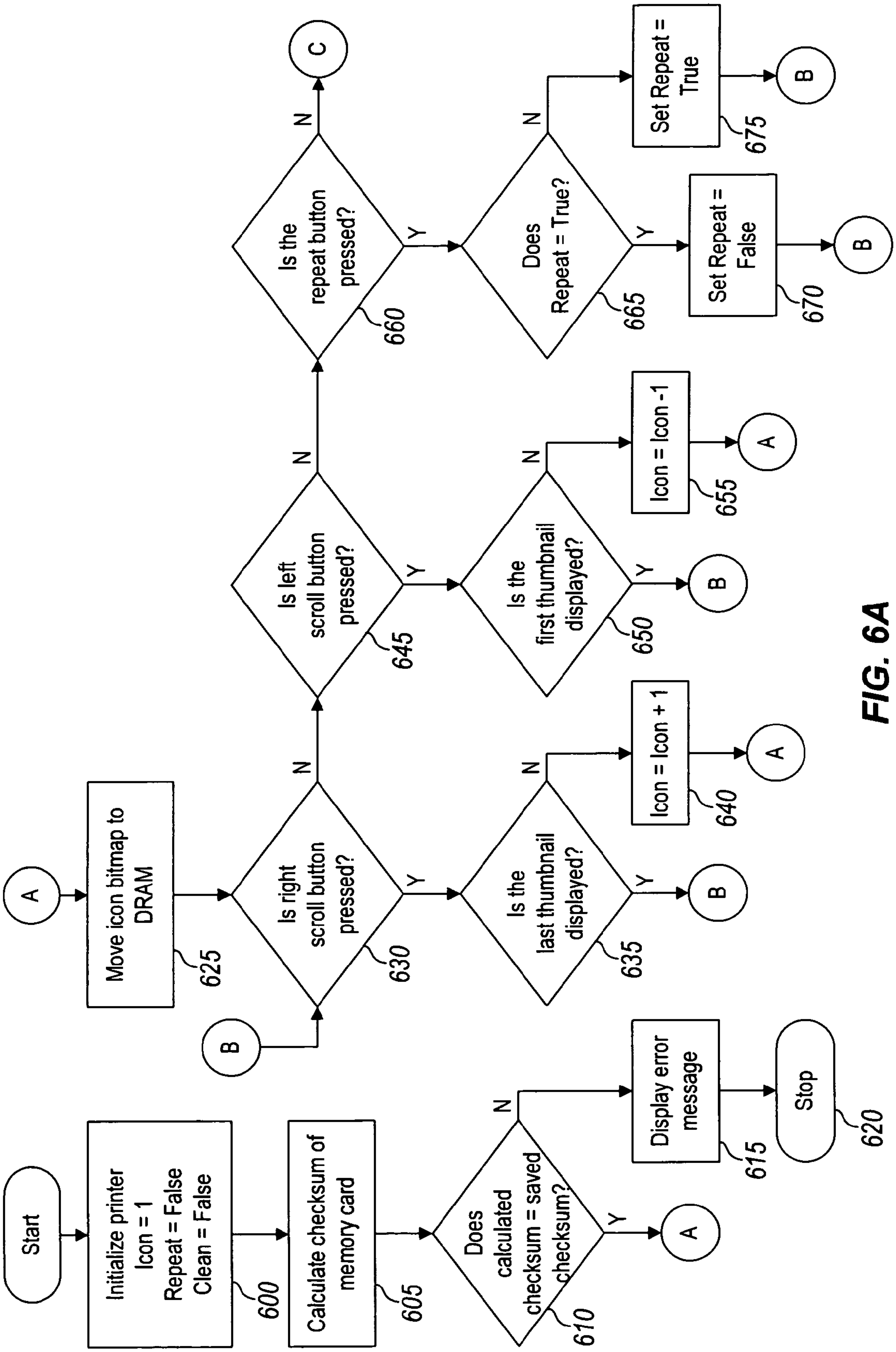
FIGS. 6A and 6B are a flow chart of the operation of a hand-held printer according to one embodiment of the invention.
Figure 6B:
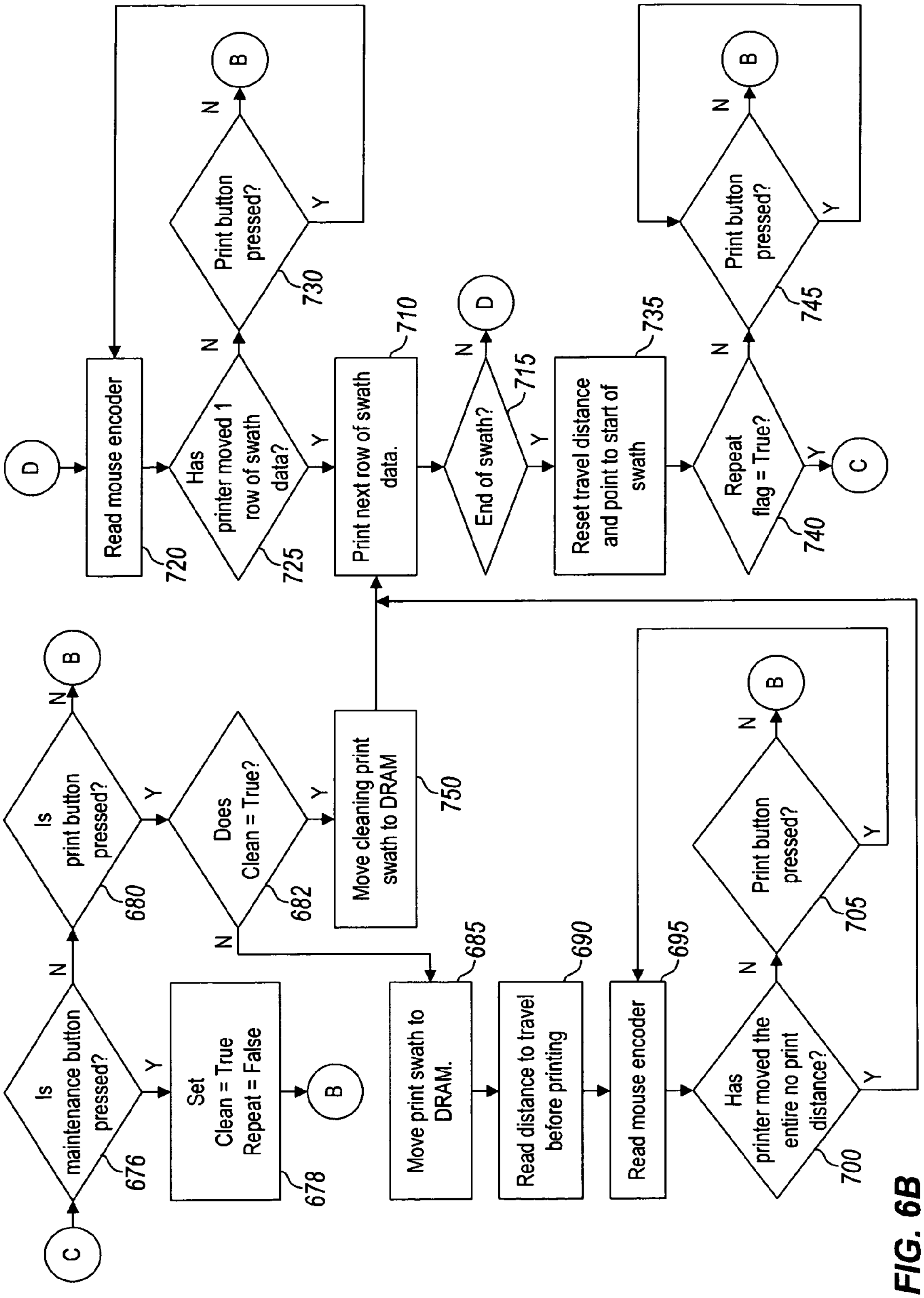

FIGS. 6A and 6B illustrate one embodiment of the operation of the hand-held printer 100. When the hand-held printer 100 is powered on, the microcontroller 305 can initialize the system (step 600). During the initialization process, a counter indicating the icon to be printed can be set to "one" to indicate the first icon stored in the memory card 225. A flag indicating the status of a repeat mode can be set to "false" to indicate that the repeat mode is turned off. A flag indicating the status of a maintenance (clean) mode can be set to "false" to indicate that the clean mode is turned off.

The microcontroller 305 can read the memory of the data table and bit-maps stored on the memory card 225 and calculate the checksum of that memory (step 605). The microcontroller 305 can compare the calculated checksum to the checksum stored on the memory card (step 610). If the checksums do not match, the microcontroller 305 can display an error message on the display 310 and can stop operation (steps 615 and 620).

If the calculated checksum and the checksum stored on the memory card 225 match (step 610), processing can continue (step 625). The microcontroller 305 can read the offset to the first bit-map from the memory card 225 (step 625). The microcontroller 305 can read the bit-map data from the memory card 225 at that offset and transfer the bit-map data to a block of memory in the DRAM module 330. The microcontroller 305 can substantially continuously display the block of memory in the DRAM module 330 where the bit-map data is stored on the display 310.

The microcontroller 305 can determine whether the right scroll button 120 is pressed (step 630). If the right scroll button 120 is pressed, the microcontroller 305 can determine whether the icon number is equal to the number of icons stored on the memory card (step 635). If the icon number is equal to the number of icons stored on the memory card, the microcontroller 305 can continue processing (step 630). If the icon number is less than the number of icons stored on the memory card, the microcontroller 305 can increase the icon number by one (step 640) and processing can continue (step 625) where the bit-map for the new icon can be moved to the DRAM module 330 and can be displayed on the display 310.

If the right scroll button 120 was not pressed (step 630), the microcontroller 305 can determine whether the left scroll button 115 is pressed (step 645). If the left scroll button 115 is pressed, the microcontroller 305 can determine whether the icon number is equal to one (step 650). If the icon number is equal to one, the microcontroller 305 can continue processing (step 630). If the icon number is greater than one, the microcontroller 305 can decrease the icon number by one (step 655) and processing can continue (step 625) where the bit-map for the new icon can be moved to the DRAM module 330 and can displayed on the display 310.

If the left scroll button 115 was not pressed (step 645), the microcontroller 305 can determine whether the repeat button 125 is pressed (step 660). If the repeat button 125 is pressed, the microcontroller 305 can determine whether the repeat flag is true (step 665). If the repeat flag is true, the microcontroller 305 can set the repeat flag to false (step 670). If the repeat flag is not true, the microcontroller 305 can set the repeat flag to true (step 675). After the repeat flag is set, the microcontroller 305 can continue processing (step 630).

If the repeat button 125 was not pressed (step 660), the microcontroller 305 can determine whether the maintenance button 130 is pressed (step 676). If the maintenance button 130 is pressed, the microcontroller 305 can set the clean flag to true and the repeat flag to false (step 678). Processing can then continue (step 630).

If the maintenance button was not pressed (step 676), the microcontroller 305 can determine whether the print button is pressed (step 680). If the print button 140 is not pressed, the microcontroller 305 can continue processing (step 630). If the print button 140 is pressed, the microcontroller 305 can determine whether the clean flag is set to true (step 682). If the microcontroller 305 determines that the clean flag is not set to true, the microcontroller 305 can retrieve the offset to the print swath stored in the memory card 225 for the icon number selected. The microcontroller 305 can move the print swath data from the memory card 225 to a block of memory in the DRAM module 330 reserved for the print swath data (step 685). The length of the data to be moved can be equal to the offset to the bit-map for the next icon minus the offset for the print swath for the selected icon. The microcontroller 305 can read from the memory card 225 the distance that the hand-held printer 100 can travel before beginning to print for the selected icon (step 690).

The microcontroller 305 can read the optical mouse encoder 320 to determine if the hand-held printer 100 has traveled a distance (step 695). The microcontroller 305 can determine whether the distance traveled equals the distance the hand-held printer 100 should travel before beginning to print for the selected icon step 700. If the hand-held printer 100 has not traveled the distance required before printing for the selected icon, the microcontroller 305 can determine whether the print button 140 is still pressed (step 705). If the print button 140 is still pressed, the microcontroller 305 can continue processing (step 695) with reading the optical mouse encoder 320. If the print button 140 is no longer pressed, printing can stop and the microcontroller 305 can continue processing (step 630).

If the microcontroller 305 determines that the hand-held printer 100 has moved the distance necessary before printing can begin for the selected icon (step 700), the microcontroller 305 can send the first row of data from the print swath to the printhead 325, causing the printhead 325 to print the data (step 710). The microcontroller 305 can then determine whether the entire print swath has been printed (step 715). If the microcontroller 305 determines that the end of the print swath has not been reached, processing can continue (step 720) where the microcontroller 305 can read the optical mouse encoder 320. The microcontroller 305 determines if the hand-held printer 100 has moved to a distance so that the next row of data from the print swath should be sent to the printhead 325 (step 725). If the microcontroller 305 determines that the distance moved is not sufficient to send the next row of data from the print swath to the printhead 325, the microcontroller 305 can determine (step 730) whether the print button 140 is stilled pressed. If the microcontroller 305 determines that the print button 140 is stilled pressed, processing can continue (step 720) with reading the optical mouse encoder 320. If the microcontroller 305 determines that the print button 140 is no longer pressed (step 730), printing can stop and the microcontroller 305 can continue processing (step 630).

If the microcontroller 305 determines that the hand-held printer 100 has moved a sufficient distance (step 725), the microcontroller 305 can continue processing at step 710 by sending the next row of data from the print swath to the printhead 325.

If the microcontroller 305 determines that the entire print swath has been sent to the printhead 325 (step 715), the microcontroller 305 can reset the distance traveled before printing to zero and can point to the start of the swath (step 735). The microcontroller 305 can determine whether the repeat flag is set to true (step 740). If the microcontroller 305 determines that the repeat flag is set to true, processing can continue (step 676) and the process of printing the icon can be repeated. If the microcontroller 305 determines the repeat flag is set to false, the print job is complete and the microcontroller 305 can determine whether the print button 140 is still pressed (step 745). If the print button 140 is still pressed, the microcontroller 305 can loop back (step 745) until the print button 140 is no longer pressed. The microcontroller 305 can then continue processing (step 630).

If the microcontroller 305 determines that the clean flag is set to true (step 682), the microcontroller 305 can move a cleaning print swath to the block of memory in the DRAM module 330 reserved for the print swath data (step 750). In one embodiment, the cleaning print swath can be an icon ½" by 12" in which every print nozzle prints at every printhead position. The cleaning print swath can clean each of the print nozzles and improve print quality. Once the cleaning print swath has been moved to the DRAM module 330, processing can continue (step 710) with printing of the print swath.

Thus, some embodiments of the invention provide, among other things, architecture for a memory card for a hand-held printer. Various features and advantages of the invention are set forth in the following claims.

What is claimed is:

1. A method of printing using a hand-held printer, the method comprising:

retrieving from a memory card a bitmap of a to-be-printed image;

displaying said bitmap on a display of said hand-held printer;

retrieving, in response to a print command, a print swath from said memory card, said print swath being associated with said displayed image and formatted specifically for use with said hand-held printer; and printing in accordance with one or more print instructions associated with said print swath wherein the step of retrieving a print swath comprises retrieving a pointer to said print swath and retrieving said print swath from a location indicated by said pointer.

2. The method of claim 1, further comprising retrieving a value from said memory and moving said hand-held computer a distance relative to said value prior to printing.

3. The method of claim 1, wherein the step of retrieving a bitmap comprises retrieving a pointer to said bitmap and retrieving said bitmap from a location indicated by said pointer.

* * * * *

UNITED STATES PATENT AND TRADEMARK OFFICE

CERTIFICATE OF CORRECTION

PATENT NO. : 7,652,787 B2
APPLICATION NO. : 11/260340
DATED : January 26, 2010
INVENTOR(S) : Ahne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-eighth Day of December, 2010

David J. Kappos
*Director of the United States Patent and Trademark Office*